(12) United States Patent
Lasson et al.

(10) Patent No.: US 6,884,206 B2
(45) Date of Patent: Apr. 26, 2005

(54) METHOD OF PRODUCING A PACKAGING MATERIAL

(75) Inventors: Rolf Lasson, Lund (SE); Nils Toft, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 28 days.

(21) Appl. No.: 10/258,969

(22) PCT Filed: May 7, 2001

(86) PCT No.: PCT/SE01/00985
§ 371 (c)(1),
(2), (4) Date: Mar. 13, 2003

(87) PCT Pub. No.: WO01/85565
PCT Pub. Date: Nov. 15, 2001

(65) Prior Publication Data
US 2003/0144123 A1 Jul. 31, 2003

(30) Foreign Application Priority Data
May 8, 2000 (SE) .............................................. 0001677

(51) Int. Cl.⁷ ................................................. B31B 1/60
(52) U.S. Cl. ...................... 493/210; 493/328; 493/338
(58) Field of Search ................................ 493/210, 328, 493/331, 338, 374, 381; 53/449, 373.9

(56) References Cited

U.S. PATENT DOCUMENTS

| 4,595,116 A | 6/1986 | Carlsson |
| 4,755,412 A | 7/1988 | Glans et al. |
| 4,815,655 A | 3/1989 | Jacobsson et al. |
| 4,819,839 A | 4/1989 | Carlsson et al. |
| 4,832,772 A * | 5/1989 | Noguchi et al. ............ 156/153 |
| 4,841,712 A * | 6/1989 | Roou .......................... 53/412 |
| 5,143,764 A | 9/1992 | Rosen |

(Continued)

FOREIGN PATENT DOCUMENTS

| EP | 0293252 | 11/1988 |
| EP | 0563691 A1 | 10/1993 |
| EP | 0686567 A2 | 12/1995 |
| EP | 0712787 A1 | 5/1996 |
| GB | 1477193 | 6/1977 |
| WO | WO 96/17725 | 6/1996 |
| WO | WO 99/20531 | 4/1999 |

Primary Examiner—Eugene Kim
(74) Attorney, Agent, or Firm—Burns, Doane, Swecker & Mathis, L.L.P.

(57) ABSTRACT

A method of producing a packaging laminate (10) in which a web is provided with through-going holes (2) which are covered on one side with a first outer layer (3) on the one side of the web and with a second outer layer (4) on the other side of the web in such a manner that the first and second outer layers (3 and 4) are permanently sealed to one another within the regions of the opening contour of the through-going holes. In order to ensure the permanent seal between the two outer layers (3 and 4), the web is subjected, after application of the first outer layer but prior to application of the second outer layer, to so-called flame-treating whereby accessible parts of the first outer layer within the regions of the through-going holes (2) are activated or polarized by means of one or more gas flames directed at the other side of the web.

14 Claims, 3 Drawing Sheets

U.S. PATENT DOCUMENTS

| | | |
|---|---|---|
| 5,162,066 A | 11/1992 | Martensson et al. |
| 5,223,194 A | 6/1993 | Rosen |
| 5,318,818 A | 6/1994 | Sjostrom |
| 5,465,842 A * | 11/1995 | Utley .................. 206/390 |
| 5,562,580 A * | 10/1996 | Beasley et al. ............ 493/194 |
| 5,609,555 A * | 3/1997 | Lee et al. ................ 493/210 |
| 5,620,550 A | 4/1997 | Andersson et al. |
| 5,626,550 A * | 5/1997 | Amero et al. ............ 493/204 |
| 5,632,440 A * | 5/1997 | Tragardh et al. ....... 229/125.15 |
| 5,851,608 A | 12/1998 | Yamada et al. |
| 6,173,554 B1 * | 1/2001 | Marbler .................. 53/412 |
| 6,279,779 B1 | 8/2001 | Laciacera et al. |
| 6,325,878 B1 * | 12/2001 | Borgstrom ................ 156/82 |
| 6,361,847 B1 | 3/2002 | Magnusson et al. |
| 6,402,019 B1 | 6/2002 | Casale |
| 6,413,350 B1 | 7/2002 | Boschi |
| 6,436,547 B1 | 8/2002 | Toft et al. |
| 6,454,161 B1 | 9/2002 | Rendina et al. |
| 6,554,182 B1 * | 4/2003 | Magnusson et al. ... 229/125.42 |
| 6,706,388 B1 * | 3/2004 | Finestone et al. ........... 428/343 |

* cited by examiner

Fig. 3

METHOD OF PRODUCING A PACKAGING MATERIAL

FIELD OF THE INVENTION

The present invention relates to a method of producing a packaging material comprising a core layer with through-going holes which are covered by a first layer applied on one side of the core layer, and a second layer applied on the other side of the core layer, the first and second layers being bonded to one another within the regions of the opening contour of the through-going holes, the method comprising the steps of providing a web of core layer with through-going holes, coating the one side of the web with a first layer, and thereafter coating the other side of the web with a second layer in such a manner that the first and second layers are sealed to one another within the regions of the opening contour of the through-going holes.

BACKGROUND OF THE INVENTION

Packaging containers of the single use disposable type for liquid foods are often produced from a packaging material of the type mentioned above. Once such commonly occurring packaging container is that which is marketed under the trademark Tetra Brik® and which is principally employed for liquid foods such as milk, fruit juice etc. The packaging material in this known packaging container typically comprises a core layer of paper or paperboard and outer, liquid-tight layers of thermoplastic.

In order to render the packaging container light- and gas-tight, in particular oxygen gas-tight, as well, the material in these packaging containers is normally supplemented with at least one additional layer, often an aluminium foil (Alifoi]) which moreover renders the packaging material thermosealable by inductive thermosealing which is a rapid and efficient sealing technique for obtaining mechanically strong, liquid- and gas-tight sealing joints or scams during the production of the containers.

Packaging containers are nowadays most generally produced by means of modem packing machines of the type which form, fill and seal packages from a web or from prefabricated blanks of packaging material.

From, for example, a web, packaging containers are produced in that the web is reformed into a tube by both of the longitudinal edges of the web being united to one another in an overlap joint. The tube is filled with the intended relevant contents and is divided into individual packages by repeated transverse seals of the tube a distance from one another below the level of the contents in the tube. The packages are separated from the tube by incisions in the transverse seals and are given the desired geometric configuration, normally parallelepipedie, by fold formation along prepared crease lines in the packaging material.

From consumer quarters, it is desirable that the packaging container be easy to handle and easy to open when it is time to empty the package of its contents, and in order to satisfy this need, the packaging container is often provided with some type of opening arrangement, with the aid of which it may readily be opened without the need to employ scissors or other implements.

A commonly occurring opening arrangement in such packaging containers includes a hole punched in the core layer of the package wall, the hole being covered, on the inside and outside of the package wall, by the respective outer layers of the packaging wall which are sealed to one another in the region of the opening contour of the through-going hole. Moreover, the prior art opening arrangement generally has a separate pull-tab or opening strip which is applied over the hole and which is rupturably sealed to the outer layer of the outside of the package wall along a sealing joint around the entire opening contour of the hole and at the same time permanently sealed to the outer layer in the region inside the opening contour of the hole.

When the packaging container is to be opened and emptied of its contents, the pull-tab or opening strip is pulled off, the rupturable seal between the pull-tab and the outer layer being ruptured at the same time as the two outer layers are torn off along the opening contour of the hole and accompany adhering to the pull-tab for exposure of the through-going hole through which the contents of the packaging container may thereafter readily be poured.

One precondition for this opening arrangement to function efficiently and expediently and expose all of the pouring hole is thus that the permanent seal between the pull-tab and the outer layer on the outside of the packaging wall is sufficiently strong so as not to be ruptured when the pull-tab is pulled off, and further the seal between the two outer layers must, within the region of the opening contour of the hole, also be sufficiently strong to ensure that both of the layers are pulled off adhering to one another.

Both of these preconditions are, as a rule, easy to satisfy with packaging containers in which both of the respective outer layers of the packaging material consist exclusively of simple, easily sealed thermoplastic layers, while, on the other hand, it is not an uncommon occurrence that problems arise in packaging containers in which one or both of the outer layers of the packaging material also include a layer of another material than thermoplastic, such as, for example, an aluminum foil which is often employed in packaging containers for oxygen gas-sensitive products, such as juice, etc.

When the outer layer on the inside of the packaging wall also includes an aluminium foil which, by the intermediary of a sealing- or lamination layer, is connected to the outer layer on the inside of the packaging wall within the region of the opening contour of the hole, it occasionally happens that the seal between the two outer layers of the packaging wall is unintentionally ruptured when the opening strip or pull-tab is pulled off, and that the outer layer on the inside of the packaging wall at best is only partly removed from the hole. As a result, the remaining part of the outer layer will prevent or impede pouring out of the contents of the packaging container.

SUMMARY OF THE INVENTION

One object of the present invention is therefore to obviate the above-described problem in connection with the prior art packaging containers.

A further object of the present invention is to realise a simple, but efficient method of producing a packaging material for a packaging container with a well-functioning opening arrangement of the type described above.

One particular object of the present invention is to realise a method of producing a packaging material for a packaging container with an opening arrangement of the type described above which ensures an efficient and expedient opening function of the packaging container also in that case when the container wall includes an aluminium foil in at least one of its two outer layers.

These and other objects and advantages will be attained according to the present invention in that the method disclosed by way of introduction has been given the characterising features as described herein.

Advantageous and expedient embodiments of the method according to the A present invention have further been given the characterising features as described herein.

According to the present invention, there will thus be realised a method of producing a packaging material comprising a core layer with through-going holes which are covered by a first outer layer applied on one side of the core layer and a second outer layer applied on the other side of the core layer, both the first and second outer layers being sealed to one another in the region inside the opening contour of the hole, the method comprising the steps of providing a web of core layer with through-going holes by punching, coating one side of the web with a first outer layer, and thereafter coating the other side of the web with a second outer layer in such a manner that the two first and second outer layers are sealed to one another in the region inside the opening contour of the through-going holes, the method being characterised in that the holed web, after coating with the first outer layer but prior to coating with the second outer layer, is subjected to treatment by so-called flame-treating in that the web is caused to pass at least one gas flame directed at the second, or uncoated, side of the web and by means of which accessible parts of the first outer layer are, for the purpose of promoting adhesion, activated or polarised in the region inside the opening contour of the through-going holes.

As a result of the above-disclosed surface treatment by means of so-called flame-treating, a polarisation or activation will be achieved of the bonding sites on the parts of the first outer layer accessible from the second, or uncoated, side, the polarised or activated bonding sites ensuring a permanent seal between the first and second outer layers when the second outer layer, in a subsequent coating operation, is applied to the web.

In one preferred embodiment of the method according to the present invention, the web consists of a web of paper or paperboard which is unwound from a magazine reel and which, after punching of the through-going holes, is coated on its one side with a first outer layer of thermoplastic, preferably polyethylene, which is extruded as a continuous curtain or film against one side of the web. The web with the extruded, first thermoplastic layer is thereafter subjected to a surface treatment by so-called flame-treating in that the web is caused to pass one or more gas flames directed at the uncoated or second side of the web and by means of which the accessible parts of the first thermoplastic layer are polarised or surface activated in the region inside the opening contour of the through-going holes. The web is thereafter coated with a second outer layer of thermoplastic, preferably polyethylene, which is extruded as a continuous curtain or film against the second side of the web and is permanently sealed to the polarised or activated parts of the first thermoplastic layer, in the region inside the through-going holes.

In another embodiment of the method according to the present invention, a laminated packaging material for a packaging container for oxygen gas-sensitive liquid products such as juice, etc., is produced, the packaging material having a core layer of paper or paperboard, a first outer layer of thermoplastic, preferably LDPE (low density polyethylene), applied on one side of the core layer and a second outer layer applied on the other side of the web and including an aluminium foil serving as light- and oxygen gas-barrier, and an outermost layer of thermoplastic, preferably LDPE, this second outer layer being sealed to the core layer by the intermediary of a sealing- or lamination layer, preferably LDPE. A web of paper or paperboard of suitable packaging quality is unwound from a magazine reel and provided with through-going holes by punching. The one side of the web is coated with a with a first, continuous outer layer of thermoplastic, preferably LDPE, by extrusion, and is thereafter caused to pass one or more gas flames directed at the second or uncoated side of the web and by means of which the accessible parts of the first, outer layer are, for the purpose of promoting adhesion, polarised or activated in the region inside the through-going holes. The web is thereafter coated with a second layer of aluminium foil and extruded layer of thermoplastic, preferably LDPE, the second layer being bonded to the web by the intermediary of a sealing- or lamination layer which is extruded between the web and the second, outer layer in such a manner that it is permanently sealed to the polarised or activated first, outer layer in the region inside the opening contour of the through-going holes.

In order further to improve the sealing bond between the first layer of thermoplastic and the paper or paperboard web, the first thermoplastic layer is extruded preferably during the supply or, or in an atmosphere of ozone, which activates and/or generates bonding seats or sites in the surface of the thermoplastic layer so that the thermoplastic layer is sealed to the one side of the web with high sealing strength.

In order to amplify the scaling strength between, on the one hand, the web and the sealing- or lamination layer and, on the other hand, between the sealing- or lamination layer and the aluminium foil of the second outer layer, the sealing- or lamination layer is preferably also extruded during the supply of, or in an atmosphere of ozone which activates and/or generates the bonding seats or sites in the surface of the sealing- or lamination layer so that this layer, with good sealing strength, can be sealed to both the web and to the aluminium foil.

As has already been mentioned, the second outer layer in this embodiment has an outermost layer of thermoplastic, preferably LDPE, bonded to the aluminium foil, and, in order to ensure a good bonding seal between the aluminium foil and the outermost thermoplastic layer, it is preferred according to the present invention to subject the exposed surface of the aluminium foil (facing away from the sealing- or lamination layer) to a sealing-promoting surface treatment prior to contact with the extruded outermost thermoplastic layer. Such a sealing-promoting treatment of the aluminium foil may, according to the present invention, suitably be put into effect using so-called flame-treating or corona-treating.

In an alternative embodiment of the method according to the present invention, a laminated packaging material with the same laminate structure as that described above, i.e. a laminate structure in which at least one of the two outer layers also includes an aluminium foil, may be produced in that a web of paper or paperboard of suitable packaging quality is unwound from a magazine reel and provided with through-going holes by punching, as previously. The holed web is thereafter coated on its one side with a first outer layer which, in this embodiment, includes an outermost layer of thermoplastic, preferably LDPE, and an aluminium foil. The aluminium foil is sealed to the web by the intermediary of a sealing- or lamination layer which is extruded between the web and the aluminium foil at the same time as the other surface of the aluminium foil (facing away from the web) is coated with the above-mentioned outermost layer of thermoplastic by extrusion.

The web with the thus applied first, outer layer is thereafter caused to pass one or more gas flames directed at the second, or uncoated side of the web and by means of which accessible parts of the surface of the extruded sealing- or lamination layer in the region inside the opening contour of the through-going holes is, for the purpose of promoting adhesion, polarised or activated in order to increase the ability of the sealing- or lamination layer to bond to another outer thermoplastic layer, preferably LDPE, which, in a subsequent coating operation, is extruded in a continuous layer against the second, or uncoated side of the web.

As in the earlier embodiment, the sealing strength between both the web and the extruded sealing- or lamination layer and between the sealing- or lamination layer and the aluminium foil can also be improved if the sealing- or lamination layer is extruded under the supply of, or in the presence of an atmosphere of ozone which activates and/or generates active bonding seats in the extruded surface of the sealing- or lamination layer so that this layer is sealed and bonded to the web and the aluminium foil, respectively, with high sealing strength.

A superior bonding or integrity of the two layers in the first outer layer, i.e. the aluminium foil and the outermost thermoplastic layer, is ensured in that the exposed surface of the aluminium foil (facing away from the web) is, prior to contact with the extruded, outermost thermoplastic layer, polarised or activated for the purpose of promoting adhesion by a suitable treatment which, according to the present invention, may be put into effect by means of so-called flame-treating or by corona-treating.

The web with the applied first layer which is surface activated for the purpose of promoting adhesion is thereafter bonded to a second layer of thermoplastic, preferably LDPE, which is extruded against the second, or uncoated, side of the web. Preferably, the second layer is extruded under the supply of, or in an atmosphere of ozone which activates and/or generates active bonding seats on the surface of the second layer by means of which this layer is permanently sealed to the web.

BRIEF DESCRIPTION OF THE DRAWINGS

The present invention will now be described in greater detail hereinbelow with particular reference to the accompanying Drawings, in which.

DETAILED DESCRIPTION OF THE INVENTION

Figure 1:
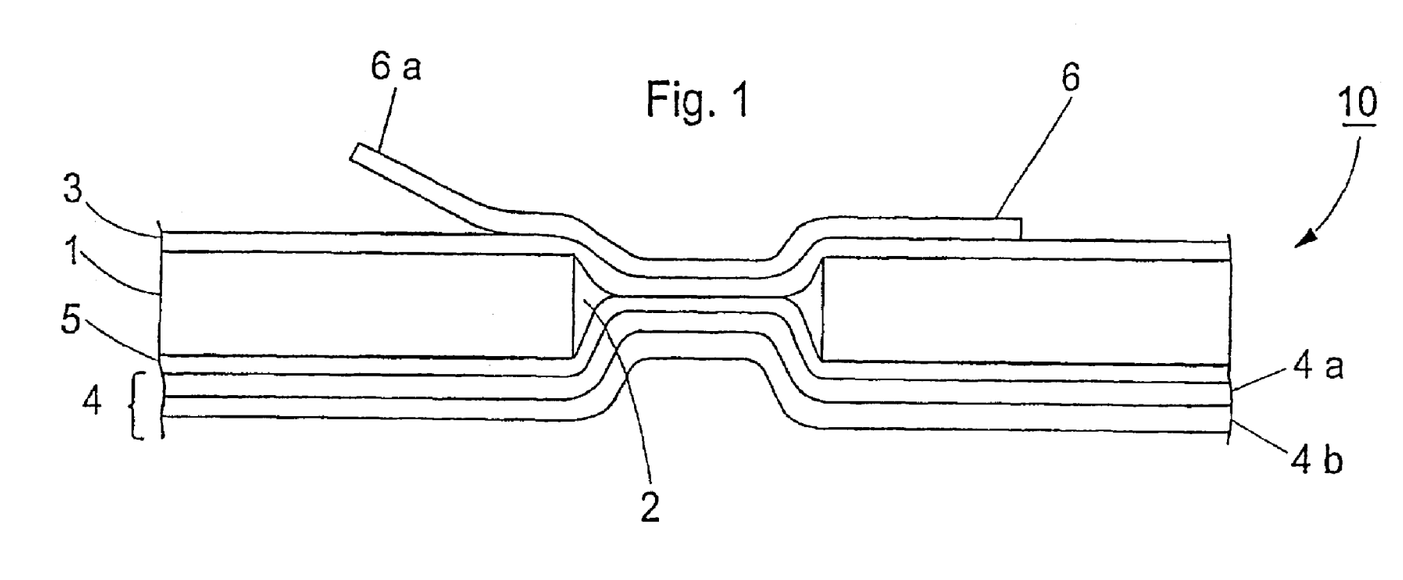
FIG. 1 is a schematic cross sectional view of a packaging material of conventional type for oxygen gas-sensitive products producing by the method according to the present invention.

FIG. 1 schematically illustrates a cross section of a packaging laminate for a packaging container for oxygen gas-sensitive products such as juice, etc.

The packaging laminate, carrying the generic reference numeral 10, has a core layer 1 of paper or paperboard of conventional packaging quality, with through-going holes 2 which, on the one, or upper side of the core layer 1, are coated by a first, outer layer 3 of thermoplastic, preferably LDPE, and on the second, or lower side of the core layer 1, by a second outer layer 4 which, in the illustrated example, includes an aluminium foil 4a serving as light- and oxygen gas-barrier, and an outermost or lowermost layer 4b of thermoplastic, preferably LDPE. The second layer 4 is bonded to both the core layer 1 and to the first layer 3 in the region inside the through-going hole 2 by a sealing- or lamination layer 5 applied between the core layer 1 and the first layer 3, respectively.

As shown in FIG. 1, the packaging laminate 10 also has a pull- or opening tab 6 applied on the first outer layer 3 and with a free end 6a serving as pull- or gripping tab with the aid of which the tab 6 is intended to be removed by pulling off for exposure of the hole 2.

In order to make possible such an exposure of the hole 2, the strip 6 is permanently sealed to the first outer layer 3 in the region inside the opening contour of the hole 2. Further, the two outer layers 3 and 4 must also be sealed to one another by the intermediary of the interjacent sealing- or lamination layer 5 with such sealing strength that the sealing joint between these two outer layers is not broken by the action of the tractive force which is applied on the opening strip or tab 6 when this is pulled off. A further requirement for ensuring a complete exposure of the hole 2 when the opening strip or pull tab 6 is pulled off is that the internal sealing strength between the two layers 4a and 4b must also be sufficiently strong to prevent the second outer layer 4 from delaminating.

Figure 2:
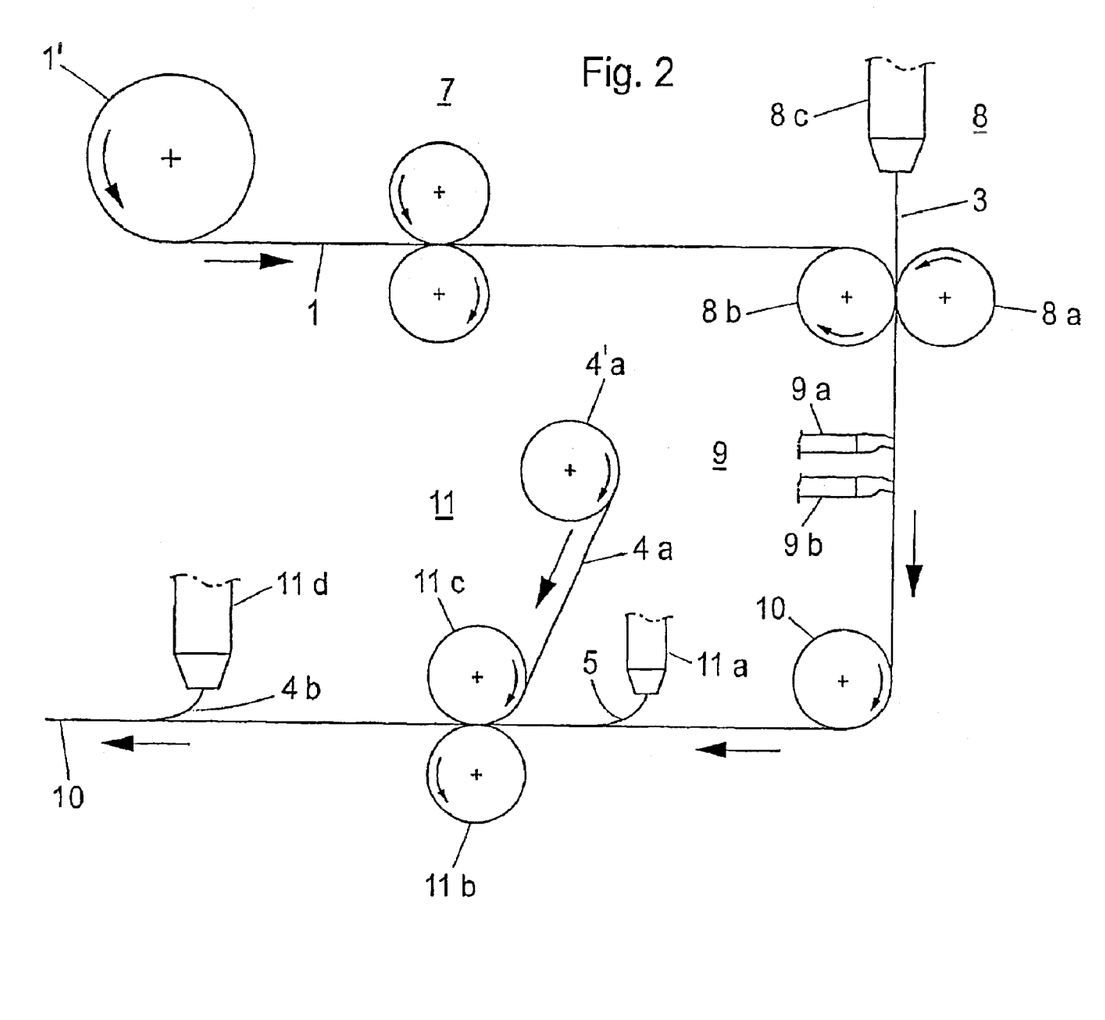
FIG. 2 schematically illustrates how the packaging material of FIG. 1 may be produced by the method according to a first embodiment of the present invention.

The illustrated packaging laminate 10 in FIG. 1 can, according to the present invention, be produced in the manner which is schematically illustrated in FIG. 2 and which effectively ensures that all conditions and preconditions for the intended opening function of the pull tab or opening strip 6 be satisfied.

From a magazine 1' to the left in the Figure, a web 1 of paper or paperboard of suitable packaging quality is unwound. The unwound web 1 is led, in the direction of the illustrated arrow, to a first processing station at 7 where the web, in a conventional method and using previously known means, is provided with through-going holes 2 (FIG. 1) by a punching operation. Since neither the method nor the equipment for providing the web 1 with these holes constitutes any germane part of the present invention, they will not be described in greater detail in this context.

The holed web 1 is thereafter led further to a first coating station at 8 where the web is led through the nip between two rollers 8a and 8b rotating in the direction of transport of the web, at the same time as the one side of the web 1 is coated with a first outer layer 3 (FIG. 1) which, by means of an extruder 8c, is extruded in the form of a continuous film 3 against the web 1 when this is led in and through the nip between the rollers 8a and 8b.

From the coating station 8, the web 1 is led with the applied first outer layer 3 further to a treatment station at 9 where the web 1 is, by means of number (two in the illustrated example) of gas flames 9a and 9b directed at the second, or uncoated, side of the web 1, subjected to an activation or polarisation treatment during which accessible parts of the first outer layer 3 are activated or polarised by the action of the above-mentioned gas flames 9a and 9b within the regions of the opening contour of the through-going holes.

From the treatment station 9, the thus treated web 1 is led via a bending roller 10 to a second coating station at 11 wherein the web 1, on its second, or uncoated, side, is coated with a sealing- or lamination layer 5 which is extruded against the web 1 by means of an extruder 11a. The web 1 with the extruded sealing- or lamination layer 5 is united with a web 4a of aluminum foil unrolled from a magazine reel 4a' and is led through the nip between two rollers 11b and 11c rotating in the direction of transport of the web, whereby the aluminium foil 4a is, by the intermediary of the extruded sealing- or lamination layer 5, sealed with good bonding adhesion permanently to both the web 1 and to the available, activated or polarised parts of the first outer layer 3 in the regions inside the opening contours of the through-going holes. In connection, with or after the passage though nip between the two rollers 11b and 11c, the exposed side (facing away from the web 1) of the aluminium foil 4a is coated with an outermost layer 4b of thermoplastic which is extruded in a continuous layer from an extruder 11d and sealed to the foil-coated web 1 for obtaining a web-shaped packaging material 10 substantially possessing the layer composition as shown in FIG. 1.

The web-shaped packaging material 10 is thereafter supplemented with separate pull or opening strips or tabs 6 (FIG. 1) which, either in connection with the production of the packaging material or at a later occasion, for example when the packaging material 10 is reformed into packaging containers, are applied on the outer layer 3 of the packaging material 10 along a rupturable sealing joint around the opening contour of the through-going holes, at the same time as the pull tabs or opening strips 6 are sealed permanently to the outer layer 3 in the region inside the opening contour of the through-going holes in order thereby to ensure the expedient opening function of the opening strips or pull tabs, as described above.

Figure 3:
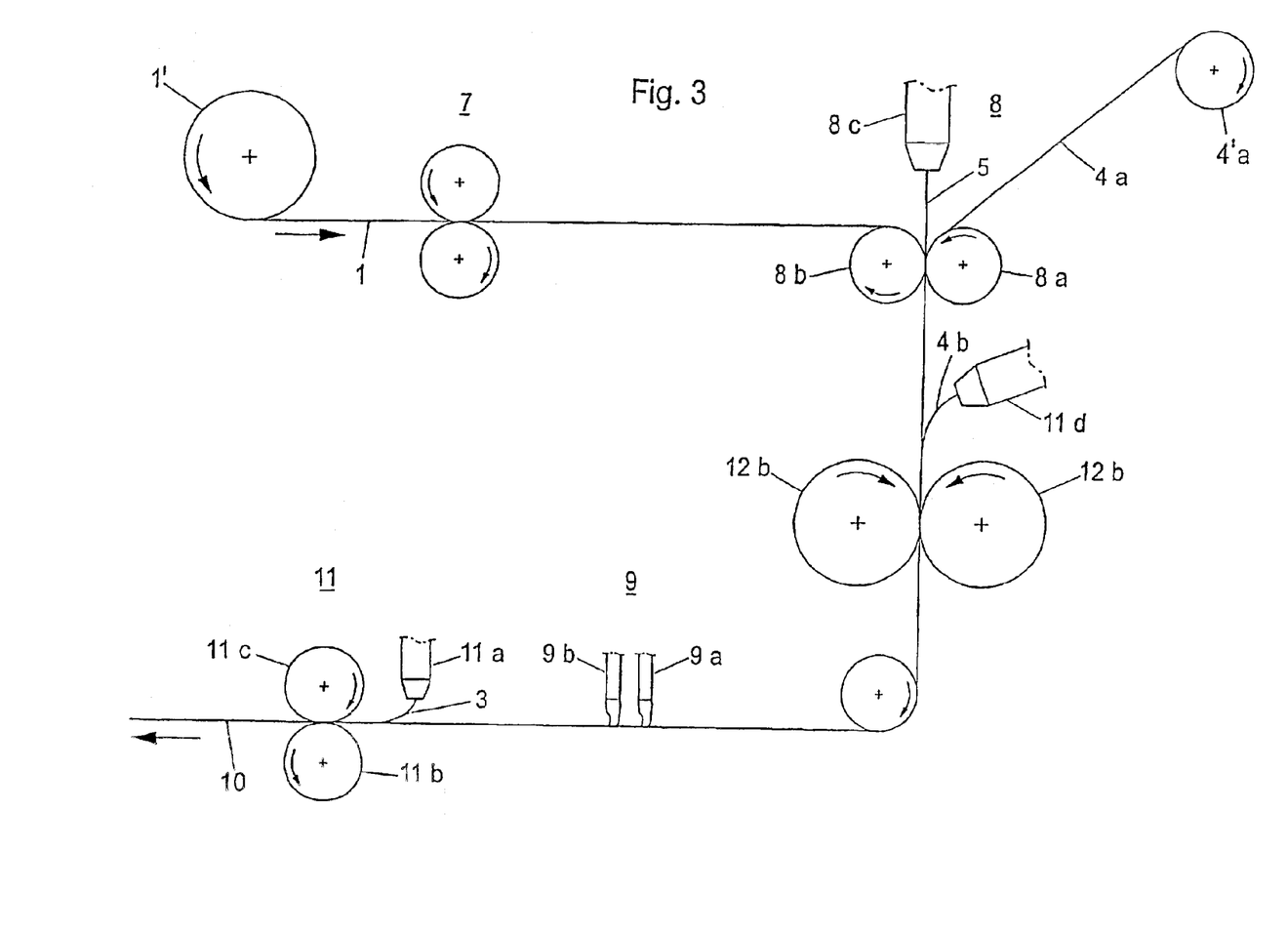
FIG. 3 schematically illustrates how the packaging material of FIG. 1 may be produced by the method according to a second embodiment of the present invention.

The packaging material 10 in FIG. 1 may, in alternative embodiment of the method according to the present invention, also be produced in the manner which is schematically illustrated in FIG. 3. For identical or similar parts as in FIGS. 1 and 2, the same reference numerals have been employed in FIG. 3.

From a magazine 1' in the upper, left-hand part of FIG. 3, a web 1 of paper or paperboard of suitable packaging quality is unwound. The unwound web 1 is led, in the direction of the illustrated arrow, to a first processing station at 7 where the web, in a conventional method and using previously known means, is provided with through-going holes 2 (FIG. 1) by a punching operation. Since neither the method nor the equipment for providing the web 1 with through-going holes neither in this embodiment constitutes any germane part of the present invention, they will not be described in greater detail in this context.

The holed web 1 is thereafter led further to a first coating station at 8 where one side of the web 1 is combined with a web 4a of aluminium foil unwound from a magazine reel 4a' at the same time as a sealing- or lamination layer 5 is extruded between the web 1 and the aluminium foil 4a by means of an extruder 8c, in the region of the entry of the web 1 into the nip between two rollers 8a and 8b rotating in the direction of transport of the web 1.

The exposed side (facing away from the web 1) of the aluminium foil 4a is coated with an outermost layer 4b of thermoplastic which is extruded in a continuous layer by means of an extruder 1id and is sealed permanently to the foil-coated web 1 when this is led through the nip between two rollers 12a and 12b rotating in the direction of transport of the web 1 in association with the extruder 1id.

After exit from the nip between the rollers 12a and 12b, the web 1 is led with the applied outer layer 4 (FIG. 1) via a bending roller 10 to a processing station at 9 where the web 1 is, by means of number (two in the illustrated example) of gas flames 9a and 9b directed at the second, or uncoated, side of the web 1, subjected to an activation or polarisation treatment during which accessible parts of the outer layer 4 are activated or polarised by the action of the above-mentioned gas flames 9a and 9b within the regions of the opening contour of the through-going holes.

The thus activated or polarized web 1 for purposes of promoting adhesion is thereafter led further to a second coating station at 11 where the web 1 is led through the nip between two rollers 11b and 11c rotating in the direction of transport of the web, at the same time as the uncoated side of the web 1 is coated with an outer layer 3 (FIG. 1) which, by means of an extruder 11a, is extruded in the form of a continuous layer against the web 1 when this is led in and through the nip between the rollers 11b and 11c. The layer 3 will, in this instance, be permanently sealed to the above-mentioned activated or polarised parts of the outer layer 4 within the region of the opening contour of the through-going holes, for obtaining a web-shaped packaging material 10 substantially having the layer composition as shown in FIG. 1.

The web-shaped packaging material 10 is thereafter supplemented with separate pull or opening strips or tabs 6 (FIG. 1) which, either in connection with the production of the packaging material or at a later occasion, for example when the packaging material 10 is reformed into packaging containers, are applied on the outer layer 3 of the packaging material 10 along a rupturable sealing joint around the opening contour of the through-going holes, at the same time as the pull tabs or opening strips 6 are sealed permanently to the outer layer 3 in the region inside the opening contour of the through-going holes in order thereby to ensure a well-operating opening function for the opening strips or pull tabs, as described above.

What is claimed is:

1. A method of producing a packaging laminate for a packaging container comprising a wall and an emptying opening including a through-hole penetrating the wall, the through-hole being covered on the outside of the container by a first outer layer of thermoplastic and on the inside of the container by a second outer layer comprising aluminum foil and a layer of thermoplastic, the first outer layer and second outer layer being releasably sealed to each other within the region of the opening contour of the through-hole by a pull or opening strip on the outside of the wall, the method comprising:

providing a web of paper or paperboard with through-holes;

covering the through-holes on a first side of the web with a first outer layer of a thermoplastic; and then covering the through-holes on a second side of the web with a second outer layer comprising aluminum foil and a layer of thermoplastic such that the first outer layer and second outer layer are sealed to each other within the regions of the opening contours of the through-holes by a sealing- or lamination layer extruded between the first outer layer and second outer layer.

2. The method as claimed in claim 1, wherein the second outer layer is applied with the aluminum foil facing towards and in contact with the sealing- or lamination layer; and the sealing- or lamination layer is, to promote adhesion, extruded in an atmosphere of ozone.

3. The method as claimed in claim 2, wherein:

the surface of the aluminum foil facing away from the sealing- or lamination layer is subjected to an activation or polarization treatment by flame-treating or by corona-treating, whereby the aluminum foil is, to promote adhesion, activated or polarized; and the as-treated surface of the aluminum foil is coated with an outermost layer which, through activated or polarized bonding seats of the aluminum foil, is permanently sealed to the aluminum foil.

4. The method as claimed in claim 1, wherein both the first outer layer and layer of thermoplastic of the second outer layer consist of low density polyethylene.

5. A method of producing a packaging laminate comprising a core layer with through-going holes which are covered by a first outer layer applied on a first side of the core layer, and a second outer layer applied on a second side of the core layer, the first and second outer layers being sealed to one another within the regions of the through-going holes, the method comprising:

providing a web of a core layer with through-going holes, coating the second side of the web with a second outer layer including an aluminum foil facing towards the web and an outermost layer applied on the surface of the aluminum foil facing away from the web, and thereafter coating the first side of the web with a first outer layer such a that the first and second outer layers are sealed to one another within the regions of the opening contour of the through-going holes and the aluminum foil and the outermost layer are disposed within the regions of the through-going holes:

wherein the web with the through-going holes, after coating with the second outer layer but prior to coating with the first outer layer, is subjected to flame-treating during which the web is caused to pass one or more gas flames directed at the first side of the web and accessible parts of the second outer layer are, to promote adhesion, activated or polarized within the regions of the through-going holes.

6. The method as claimed in claim 5, wherein the first outer layer and second outer layer are sealed to one another by the intermediary of a sealing- or lamination layer which is extruded between the first outer layer and second outer layer.

7. The method as claimed in claim 6, wherein the sealing- or lamination layer is to promote adhesion, extruded in an atmosphere of ozone.

8. The method as claimed in claim 6, wherein:

the surface of the aluminum foil facing away from the sealing- or lamination layer is subjected to an activation or polarization treatment by flame-treating or by corona-treating, whereby the aluminum foil is, to promote adhesion, activated or polarized; and as-activated or polarized surface of the aluminum foil is coated with the outermost layer which, through the activated or polarized bonding seats of the aluminum foil, is permanently sealed to the aluminum foil.

9. The method as claimed in claim 5, wherein the core layer consists of paper or paperboard; and both the first outer layer and the outermost layer of the second layer consist of thermoplastic.

10. The method as claimed in claim 1, wherein the packaging laminate comprises separate opening strips or pull tabs which are applied on the first outer layer of the packaging laminate such that the opening strips or pull tabs are sealed to the first outer layer in a rupturable sealing joint around the opening contour of each respective through-going hole, at the same time that the opening strips or pull tabs are sealed permanently to the first outer layer within the regions of each respective opening contour of the through-going holes.

11. A packaging container which is produced from a packaging laminate produced according to the method as claimed in claim 1.

12. The method as claimed in claim 1, wherein the surface of the aluminum foil facing away from the sealing- or lamination layer is subjected to an activation or polarization treatment by flame-treating or by corona-treating, whereby the aluminum foil is, to promote adhesion, activated or polarized, and the as-treated surface of the aluminum foil is coated with an outermost layer which, through the activated or polarized bonding seats of the aluminum foil, is permanently sealed to the aluminum foil.

13. A packaging container which is produced from a packaging laminate produced according to the method as claimed in claim 5.

14. The method as claimed in claim 5, wherein the core layer consists of paper or paperboard; and both the first outer layer and the outermost layer of the second layer consist of low density polyethylene.

* * * * *

UNITED STATES PATENT AND TRADEMARK OFFICE
CERTIFICATE OF CORRECTION

PATENT NO. : 6,884,206 B2
DATED : April 26, 2005
INVENTOR(S) : Rolf Lasson et al.

It is certified that error appears in the above-identified patent and that said Letters Patent is hereby corrected as shown below:

<u>Title page,</u>
Item [30], Foreign Application Priority Data, "000167" should read -- 000167-4 --.

Signed and Sealed this

Sixteenth Day of August, 2005

JON W. DUDAS
*Director of the United States Patent and Trademark Office*